United States Patent

[11] 3,554,535

| [72] | Inventor | Martin E. Gerry<br>13452 Winthrope St., Santa Ana, Calif. 92705 |
|---|---|---|
| [21] | Appl. No. | 806,388 |
| [22] | Filed | Mar. 12, 1969 |
| [45] | Patented | Jan. 12, 1971 |

[54] REVERSIBLE VEHICLE WHEEL
8 Claims, 4 Drawing Figs.

[52] U.S. Cl. .................................................. 301/63
[51] Int. Cl. .................................................. B60b 3/08
[50] Field of Search .......................................... 301/63, 64

[56] References Cited
UNITED STATES PATENTS

| 1,461,229 | 7/1923 | Slaymaker | 301/9(TV) |
| 1,683,738 | 9/1928 | Stanley | 301/63(DD) |
| 1,821,954 | 9/1931 | White | 301/63X |
| 3,410,605 | 11/1968 | Mayrath | 301/64 |

FOREIGN PATENTS

| Ad. 35,828 | 11/1929 | France | 301/63 |
| 857,538 | 12/1960 | Great Britain | 301/5(B) |

*Primary Examiner*—Richard J. Johnson

ABSTRACT: A tire rim and a pair of spider members circumferentially attached at the outer peripheries thereof at least in part to the tire rim for providing virtually uniform force distribution over the tire rim during rotational action of the vehicle wheel. The spider members are paraboloidal in shape, the inner portions of these members being adjacent to each other. The wheel is reversible offering a choice of design patterns in the spider configurations.

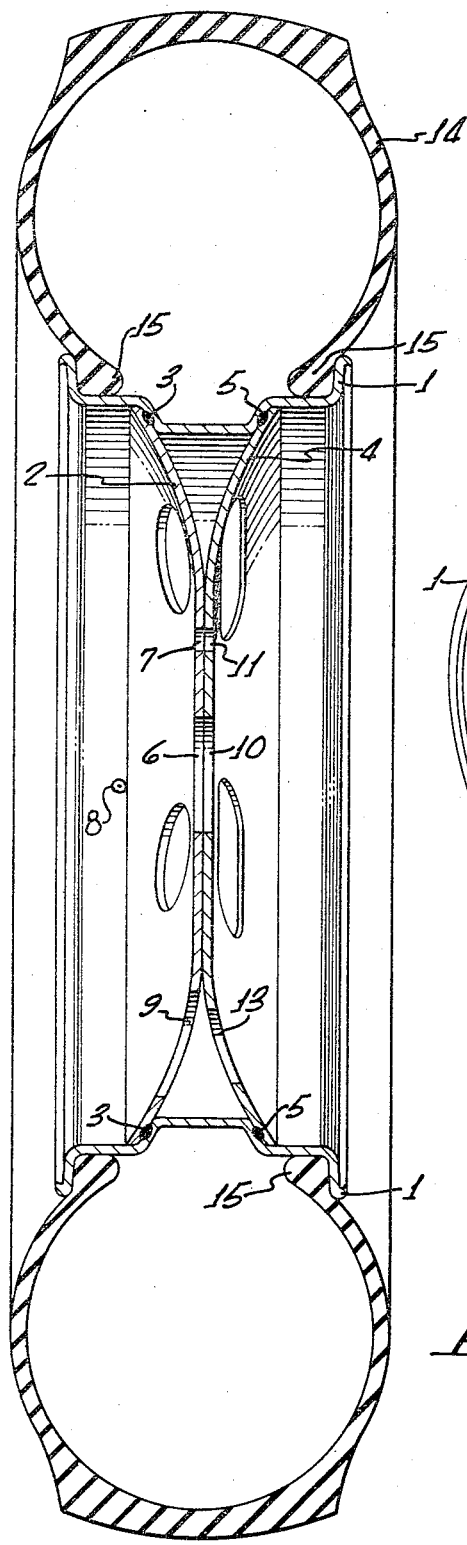
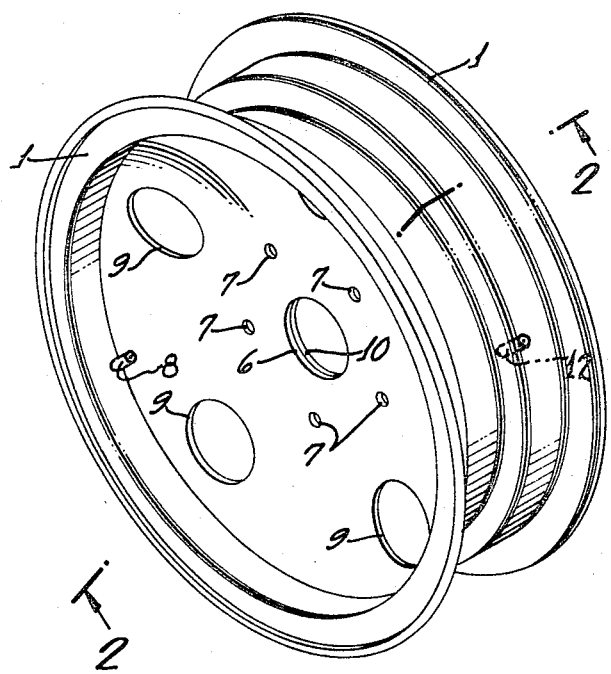
Fig. 1.
Fig. 2.

3,554,535

REVERSIBLE VEHICLE WHEEL

BACKGROUND OF THE INVENTION

The prior art offers a wheel design either with a single spider of heavy gage metal.

These wheels are firstly unbalanced, inasmuch as the spider is attached to one side of the tire rim making it necessary to provide balancing by the use of external weights on the wheel rim to avoid improper tire wear.

The addition of reinforcing members does nothing for the unbalance situation but only attempts to strengthen the spider against rotations action thereof.

Still additional disadvantages reside in the nonuniform force distribution over the tire rim due to the single spider.

Further disadvantages result in not being able to reverse the wheel to obtain uniform tire wear unless the tire is removed from the wheel and reinstalled thereon.

Still further disadvantages are that only one design pattern is available to the observer with the single spider configuration.

INVENTION SUMMARY

The instant invention provides generally parabolically shaped spiders attached to the wheel rim by resistance welding at the outer peripheries of the spiders. This type of weld offers the advantage of attaching the rim to the spider where the surfaces of each contact each other making the weld invisible and resulting in the weld not being an obstruction to the mounting of a tire on the rim. The parabolic shapes of the spiders wherein the inner portions of the convex surfaces of the spiders are adjacent to each other provides a divergent structure of the spider peripheries with respect to the tire rim so that the forces due to rotational action are generally uniformly distributed over the tire rim. This uniform distribution of forces enables gage metal to be utilized in each of the two spiders that is thinner than when a single spider is used and offers greater ease of fabrication, less tool wear, and greater resistance to rotational force breakdown of the tire rim.

The construction used, wherein the spiders are of steel and the rim is of steel offers greater elastic limits to the wheel and better assurance against fracturing of the spiders or the rim. Further, the construction used makes the wheel virtually self-balancing and avoids the need for additional and unsightly weights on the tire rim. This construction also offers a reversible wheel which may have different design patterns therein to enhance the appearance of the wheel and to change the appearance of the vehicle by reversing the wheels when desired. Hence, in this configuration, it is possible to reverse the tire of the wheel without removing same from the tire rim.

DRAWING ANALYSIS

FIG. 1 is a perspective view of the dual spider wheel showing one of the spiders attached to the tire rim, but not having the tire mounted thereon;

FIG. 2 is a section view partially in cross section and partially in perspective taken at plane 2—2 of FIG. 1 but including a tire mounted on the wheel rim to show the relationship between the tire and the wheel;

Figure 3:
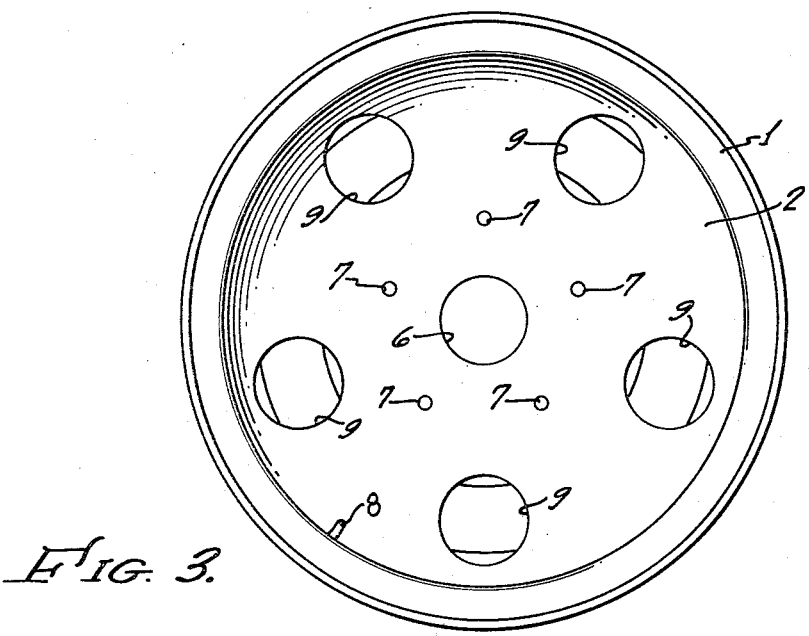
Figure 4:
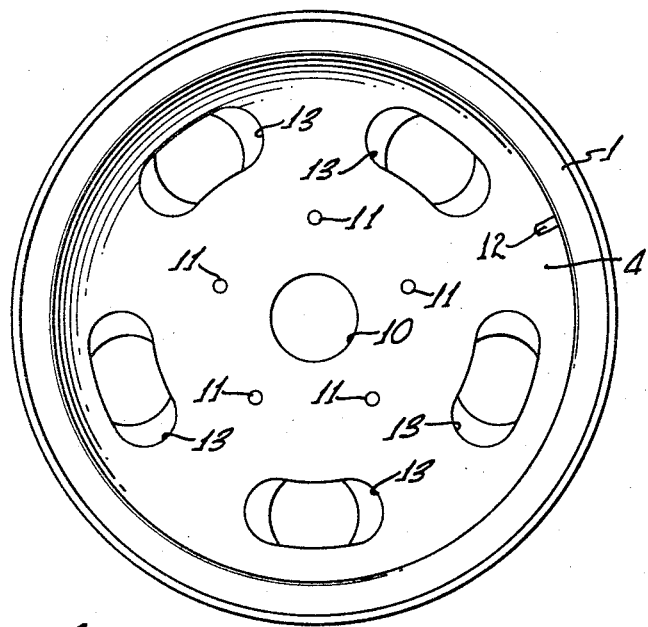

FIG. 3 is a plan view of the left side of the wheel showing one of the spiders and the tire rim, and showing circular hole design pattern in the spider as well as showing the mounting apertures therein; and FIG. 4 is a plan view of the right side of the wheel showing the other of the spiders and the tire rim, and showing kidney-shaped hole design pattern in the spider as well as showing the mounting apertures therein.

EXEMPLARY EMBODIMENT

Reference is made to FIGS. 1 through 4 wherein a reversible vehicle wheel having a tire rim and a pair of spider members circumferentially attached to the tire rim for providing virtually uniform force distribution over the tire rim during rotational action of the vehicle wheel.

The wheel is comprised of tire rim 1 to which has circumferentially attached thereto by resistance or other type of welding or has otherwise attached a paraboloidal spider 2 and a paraboloidal spider 4.

The wheel is comprised of rim 1 to which paraboloidal spider 2 is attached by means of circumferential weld 3 which may be a resistance or other type of weld or may be any means for attaching spider 2 to the rim on at least a portion of the spider outer periphery. Spider 4 is attached to the rim by means of circumferential weld 5 which may be a resistance or other type of weld or may be any means for attaching spider 4 to the rim on at least a portion of the spider outer periphery.

Spider members 2 and 4 are paraboloidal members wherein the inner portions of the convex surfaces thereof are adjacent to each other, and wherein the outer peripheries of these paraboloidal members are attached to the tire rim.

An axle mounting aperture 6 is provided in spider 2 through which the vehicle axle extends. Another axle mounting aperture 10 is provided in spider 4, the aperture 6 being aligned with the aperture 10. Spider 2 also has a plurality of stud-admitting apertures 7, whereas spider 4 has an equal number of stud-admitting apertures 11 aligned with apertures 7. The studs normally attached to the brakedrum extend through these apertures and the wheel when mounted has one of the spiders held against the brakedrum by means of nuts or lugs threadably engaging the brakedrum studs. A hubcap fitting over the end of the axle and having a flange or flanges with apertures therein that fits the studs is used with this wheel, the nuts holding the hubcap and the vehicle wheel. The nuts, studs and hubcap are not shown herein. The wheel may be mounted on either side, with either spider 2 or 4 cooperating with the brakedrum. Depressions (not shown) may be provided in the surfaces of the spiders to allow sufficient clearance of bolt heads that may be used to attach the brakedrum to the vehicle axle, thereby providing good cooperation of the spider surface with the brakedrum surface.

Spider 2 has a design pattern therein which beautifies the wheel, consisting of a plurality of round apertures 9 in a circular pattern therein, although apertures of any shape could be used or merely depressions coined in the spider which may be painted or the depression surfaces otherwise treated to differentiate the depressions from the rest of the spider surface.

Spider 4 has a design pattern therein which beautifies the wheel, consisting of a plurality of kidney-shaped apertures 13 in a circular pattern therein, although apertures of any shape could be used or merely depressions coined in the spider which may be painted or otherwise treated to differentiate the depressions from the rest of the spider surface. The different spider designs provide a reversible wheel design.

The welds of the spiders to the rim are hidden from view inasmuch as resistance welding will provide a weld between the nonvisible surfaces of the spiders and the rim. Hence when a tire 14 is mounted on the rim, the beaded ends 15 thereof at the inner circumference of the tire will not interfere with any obstructions created if a weld such as an arc weld were used to attach the edge of the spider to the rim wherein the heat of the welding torch is applied through the rim. The freedom of interference permits tight cooperation of the walls of the tire with the tire rim when the tire is inflated.

Valve means 8 provided on the same side of the rim as the outer periphery of spider 2, and valve means 12 on the same side of the rim as the outer periphery of spider 4, are 180 degrees oppositely installed from each other for providing wheel balance and for providing easy access for inflating the tire with air no matter which spider faces the outside of the vehicle when the wheel is mounted on the vehicle.

I claim:
1. A reversible vehicle wheel, comprising:
   a tire rim forming a drop center portion with two substantially radially extending wall portions;
   a first disc member of a generally smooth flaring shape; and
   a second disc member generally of the same smooth and substantially identical shape as said first disc member, each of said first and second disc members being attached at the outer periphery thereof in surface to surface engagement respectively with each of said two wall portions, the convex surface portions of said disc members being substantially in surface-to-surface engagement at an imaginary plane radially extending and substantially bisecting the center of the drop center portion of the rim and the interface of the convex surface portions of the discs.

2. The reversible vehicle wheel as stated in claim 1, including:
 a tire mounted on said tire rim; and
 valve means provided on the rim and oppositely displaced from each other for inflating the tire from either side of the wheel and for providing wheel balance.

3. The reversible vehicle wheel as stated in claim 1, wherein said disc members are of steel for providing greater elastic limits to the vehicle wheel during rotational action thereof.

4. The reversible vehicle wheel as stated in claim 1, wherein each of said disc members has an axle mounting aperture at its center and a plurality of a stud-admitting apertures for mounting said wheel, the axle mounting apertures being aligned with each other and each stud mounting aperture of the first disc member being aligned with a corresponding stud mounting aperture of the second disc member for optionally mounting said vehicle wheel on either side thereof.

5. The reversible vehicle wheel as stated in claim 1, wherein said disc members have design patterns therein.

6. The reversible vehicle wheel as stated in claim 1, wherein said disc members have different design patterns therein.

7. The reversible vehicle wheel as stated in claim 1 said disc members being attached at their outer peripheries to the extending wall portions of the rim by means of welds.

8. The reversible vehicle wheel as stated in claim 7, wherein said welds are at the interface between the outer peripheries of the disc members and the radially extending wall portions of the drop center of the rim.